Dec. 15, 1925.  
W. P. COTTRELL  
FILTER  
Filed Oct. 28, 1924

1,565,988

INVENTOR.
William P. Cottrell
BY Nestall and Wallace
ATTORNEYS.

Patented Dec. 15, 1925.

1,565,988

UNITED STATES PATENT OFFICE.

WILLIAM P. COTTRELL, OF LOS ANGELES, CALIFORNIA.

FILTER.

Application filed October 28, 1924. Serial No. 746,325.

*To all whom it may concern:*

Be it known that I, WILLIAM P. COTTRELL, a subject of the King of England, and resident of Los Angeles, in the county of Los Angeles, State of California, have invented new and useful Improvements in Filters, of which the following is a specification.

This invention relates to an adjustable filter wherein the filtering medium is disposed between rigid walls.

It is an object of this invention to provide a filter of the class described wherein the walls may be adjustably positioned with respect to one another so as to adjust the compression on the filtering medium and thereby increase or decrease the effective porosity or the straining quality. Another object of this invention is to provide a filter of the class described wherein the liquid being treated is caused to travel through the wall of a filtering medium but in a path along the wall instead of directly through the same. A further object of this invention is to provide a simple, compact, durable, efficient and long lived filter, easily cleaned in which the filtering medium may be replaced with a minimum of trouble.

Figure 1:
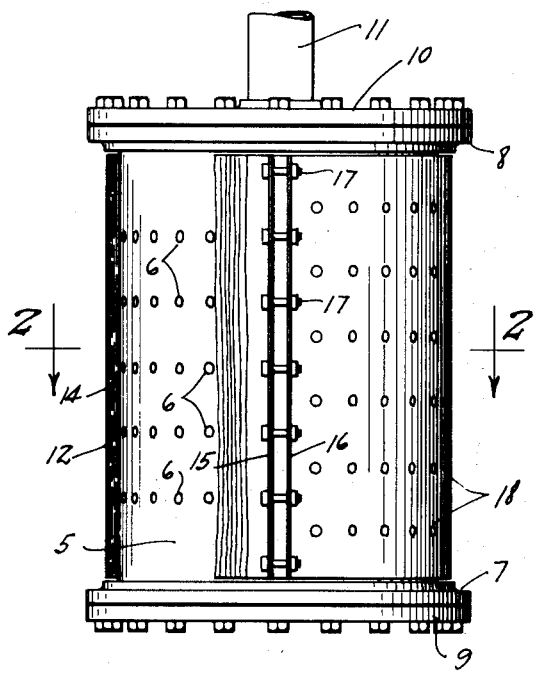
Figure 3:
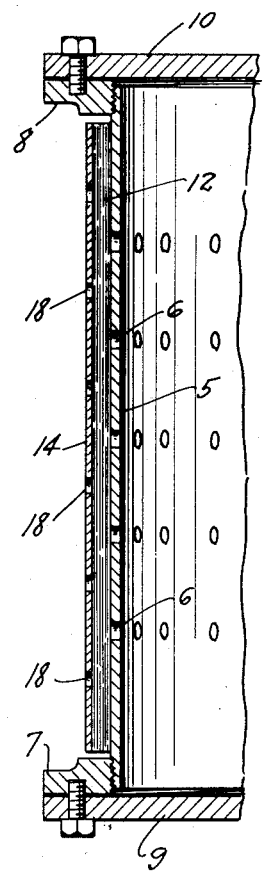
Figure 2:
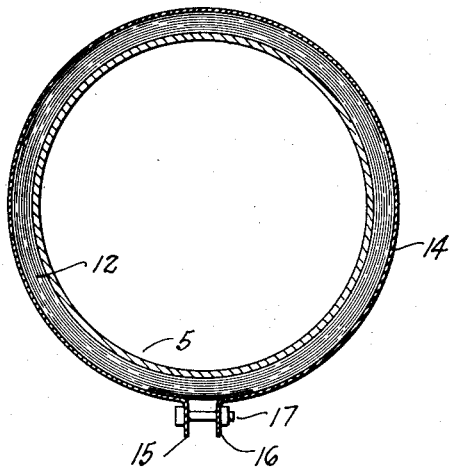

These objects together with other objects and corresponding accomplishments are obtained by means of the embodiment of my invention illustrated in the accompanying drawing, in which:

Fig. 1 is an elevation partly in section of a filter; Fig. 2 is a section as seen on the line 2—2 of Fig. 1; and Fig. 3 is a fragmentary section through the filter shell on an enlarged scale.

Referring more particularly to the drawing, the embodiment shown herein consists of a closed shell having a wall of material impermeable to liquid, a similar wall spaced therefrom, and filtering material therebetween. The cylindrical shell 5 is provided with perforations 6 distributed over its surface. This shell may be made of steel or like material. The outer ends are externally threaded, and mounted thereon are rings 7 and 8. Secured to the ring 7 is a head forming a closure plate for the shell. Secured to the ring 8 is a head 10 to which is connected a pipe 11 through which the material being filtered enters the shell. The joints are suitably packed so that leakage will not occur. Wrapped around the wall 5 so as to cover the same, is the filtering medium indicated by 12. This medium may be filter cloth wound around the wall 5 so as to provide a number of layers. Enveloping the filtering medium is a cylindrical wall 14, preferably split and having ears 15 and 16 with registering bolt holes to receive tightening bolts 17. The envelope wall 14 is provided with perforations 18. These perforations are so disposed in the envelope that they will not register or align with the perforations 6 in the wall 5.

It is obvious that the material to be filtered may be placed under pressure and will pass through the perforations 6 of the inner wall, into the filtering medium 12, along the filtering medium until it reaches a perforation 18 through which it will discharge. The precipitate may lodge in the pores of the filtering medium. By adjusting the bolts 17 so as to change the pressure of the envelope wall upon the filtering medium, the porosity of the latter may be changed. By increasing the pressure, a higher degree of filtration is obtained. It is obvious that pressure applied to the material being filtered will not cause the filtering medium to be blown out at the perforations, as might be the case if the perforations in the envelope and inner wall were in registration. The filter may be cleaned by blowing air or other fluid therethrough, and the speed of cleaning may be increased by loosening the bolts 17 so that the solid matter in the filtering medium may pass therefrom more quickly.

Although I have shown a cylindrical shell herein, any type of shell may be used. The provision of a wall of the composite character of the wall of the shell, wherein the exterior walls may be arranged to exert an adjustable pressure upon a filtering medium therebetween is within the scope of my invention.

What I claim is:

1. A filter comprising spaced walls of impermeable material with perforations for fluid, the perforations being out of registration with one another so that fluids passing through said walls must travel therebetween for a substantial distance, a compressible filtering medium packed therebetween, and means to adjust the compression of said walls upon said medium.

2. A filter comprising a shell having an inner wall and an outer wall spaced therefrom, each of said walls having passages for fluid, said passages being out of registration, a compressible filtering medium packed therebetween, and means to adjust the compression of said walls upon said medium.

3. A filter comprising a shell having an inner wall and an outer wall spaced therefrom, each of said walls being of impermeable material and provided with perforations for fluid, the perforations being out of registration, a compressible filtering medium packed therebetween, and means to adjust the compression of said walls upon said medium.

In witness that I claim the foregoing I have hereunto subscribed my name this 23rd day of October, 1924.

WILLIAM P. COTTRELL.